United States Patent [19]
Lemery

[11] 3,877,658
[45] Apr. 15, 1975

[54] FISHING REEL

[75] Inventor: Jean Paul Lemery, Cluses, France

[73] Assignee: Etablissements Carpano & Pons S.A., Cluses, France

[22] Filed: July 31, 1972

[21] Appl. No.: 276,537

[30] Foreign Application Priority Data
Aug. 4, 1971 France .............................. 71.28623

[52] U.S. Cl. ........................................... 242/84.2 A
[51] Int. Cl. ............................................... A01k 89/00
[58] Field of Search.... 242/84.2 A, 84.2 R, 84.21 A

[56] References Cited
UNITED STATES PATENTS

| | | | |
|---|---|---|---|
| 3,108,760 | 10/1963 | Nurmse | 242/84.2 A |
| 3,116,894 | 1/1964 | Rule | 242/84.2 A |
| 3,298,629 | 1/1967 | Small | 242/84.2 A |

*Primary Examiner*—Billy S. Taylor
*Attorney, Agent, or Firm*—Robert E. Burns; Emmanuel J. Lobato; Bruce L. Adams

[57] ABSTRACT

The line-release control push button or trigger of a spin casting reel includes an asymmetric actuating surface shaped to correspond with the fore part of an angler's thumb, and spaced-apart side walls including parallel inner faces at least partially engaging over and outside corresponding parallel outer faces of the reel housing, thereby reducing the ingress of foreign bodies and liquids into the reel mechanism.

2 Claims, 5 Drawing Figures

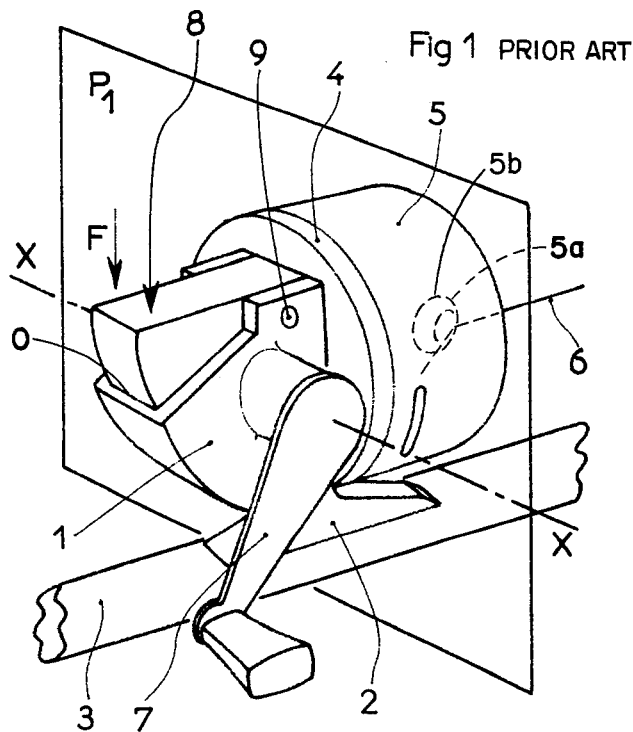
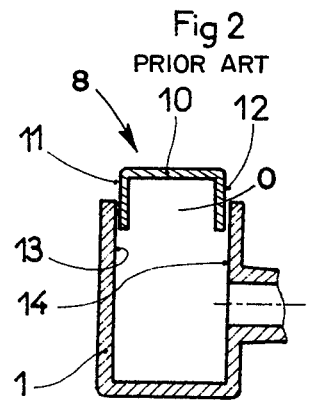
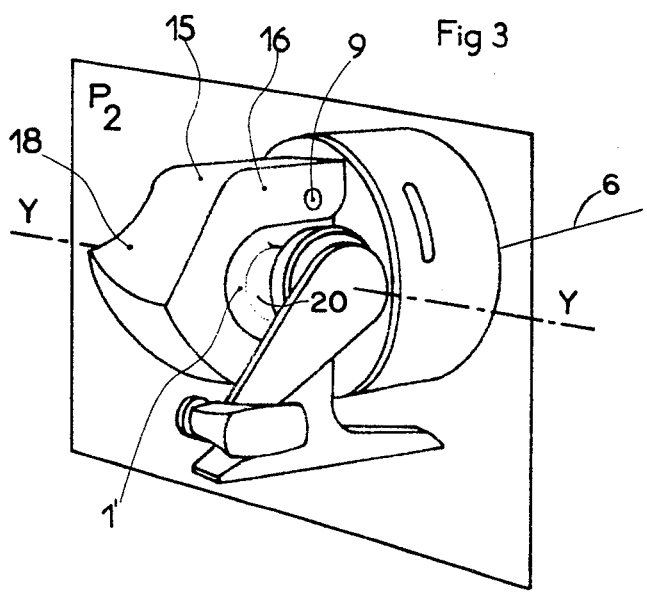
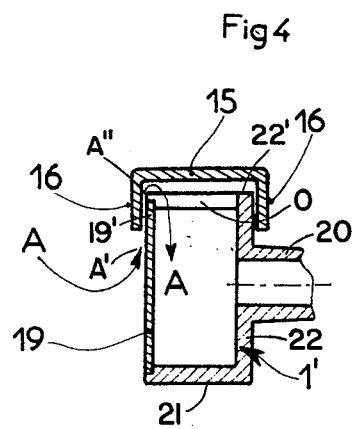
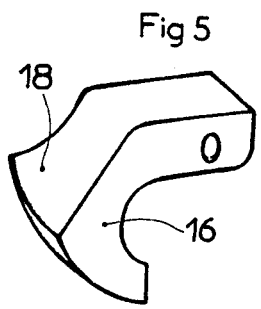

FISHING REEL

FIELD OF THE INVENTION

The invention relates to fishing reels and is particularly concerned with spin casting reels.

DESCRIPTION OF THE PRIOR ART

A well known type of spin casting reel is shown in FIGS. 1 and 2 of the drawings, in which:

FIG. 1 is a perspective view thereof mounted on a rod; and

FIG. 2 is a partial schematic cross-section taken in plane P1 of FIG. 1, passing through the axis X—X of the winding handle.

This known reel comprises a housing 1, made in one or more parts, integral with a support foot 2 by means of which the reel is secured to a rod 3. Housing 1 includes a circular front face 4 upon which is secured a cap or nose cone 5 which encloses a fixed line spool, not shown, whose axis is disposed concentric to nose cone 5 and therefore parallel to the general direction of rod 3. Line 6 wound on the spool passes out of nose cone 5 through a central aperture 5a. After a cast, the line 6 is wound back onto the spool by means of a winding handle 7, whose axis X—X is perpendicular to the general direction of rod 3, which actuates a mechanism, not shown, including a gear train and a winding cup with a line pick-up member. A push button or trigger 8 is pivotally mounted on casing 1 about a pin 9 and controls, upon depression of the push button 8 by the angler's thumb when casting, a forward axial movement of the winding cup to immobilize the line between a forward portion 5b of the winding cup and the nose cone. A spring, not shown, is provided to return the push button to its original position, as shown in FIG. 1, so that the winding cup moves back axially and allows the line to wind out freely. Housing 1 has an upwardly-rearwardly facing opening O.

In the view of FIG. 2, it can be seen that push button 8 is inserted in opening O and partly closes the same. Pushbutton 8 has inverted, generally U-shaped cross-section, with a central part 10 and parallel spaced apart side walls 11 and 12. Part 10 forms an actuating surface which is acted upon by the angler's thumb in direction F (FIG. 1). The outer faces of side walls 11 and 12 penetrate freely between corresponding parallel inner faces of housing 1. To provide a free rotation of push button 8 about pin 9, a certain lateral play is left between the outer faces of walls 11 and 12 and the corresponding inner faces of housing 1. This play inevitably leads to the possibility of introduction of dust, sand, water and so on into housing 1, which impairs the operation of the internal mechanism of the reel, increases wear and necessitates a not infrequent maintenance of the reel. This drawback is aggravated by the fact that, when fishing, the angler's thumb which acts on the push button is quite likely to be dirty due to inevitable contact with the ground, fish caught, vegetation and so on; foreign bodies carried by the thumb are thus likely to work their way into the housing 1 during repeated action on push button 8.

SUMMARY OF THE INVENTION

It is an object of the invention to overcome the drawbacks mentioned above.

According to the invention, in a reel of the above type, said push button includes an outer actuating surface and spaced apart side walls, said side walls including inner faces disposed at least substantially parallel to one another and engaging over and outside corresponding spaced apart at least substantially parallel outer faces of the housing during the entire operative range of movement of said push button.

Said side walls cover the walls of the housing and render the introduction therein of water and foreign bodies more difficult.

DESCRIPTION OF A PREFERRED EMBODIMENT

A preferred embodiment of a reel according to the invention will now be described with reference to FIGS. 3 to 5 of the drawings, which:

FIG. 3 is a perspective view thereof;

FIG. 4 is a partial schematic cross-section taken in plane P2 of FIG. 3, passing through the axis Y—Y of the winding handle; and FIG. 5 is a perspective view of the push button removed from the reel.

The general construction of the reel shown is the same as for the reel of FIG. 1, apart from the push button, provided in any suitable rigid material such as stamped or cast metal or moulded synthetic resin, which includes an outer surface 15 including an actuating part 18 and two spaced apart side walls 16. As before, the push button is pivotally mounted to the housing about a pin 9, disposed parallel to axis Y—Y, but according to the invention parallel inner faces of side walls 16 are disposed outside corresponding parts of the parallel outer faces of housing 1', as shown in FIG. 4, thereby providing improved closure of the opening O. The part 18 is asymmetrically shaped to correspond at least substantially to the shape of the fore part of a thumb applied thereon when the reel is held as for casting, so that the pressure applied by the angler's thumb is fully and effectively transferred to the inner mechanism, not shown, of the reel.

In the preferred embodiment, shown by the drawing, casing 1 is formed in two parts, a main body including a bearing 20 for the shaft of handle 2, and a cover 19 secured for the main body by any known means. To further hinder the ingress of foreign bodies and liquids, the upper aperture of the housing 1' can, at least partially, be closed by a cover, not shown. As shown in FIG. 4, the main body of housing 1' comprises a bottom wall 21 and a side wall 22 upstanding therefrom. The outer surfaces of sidewall 22 and cover 19 are parallel to one another and extend upwardly to upper edges 22', 19', defining the opening O. The path schematically indicated by arrows A, and available for penetration of foreign bodies into the inner part of housing 1' considerably hinders their introduction, as compared to the prior arrangement shown in FIG. 2. According to the invention this path A includes an upward restricted portion A', A'', which was not provided in the prior art construction of FIG. 2. Foreign bodies are generally unlikely to rise through such an upward, restricted portion. The same is true as regards the penetration of water into the housing 1' under the effect of gravity. Since in operation the reel and housing 1' are placed above the rod, the ingress of foreign bodies is definitely reduced during normal operation.

The invention can be applied to all fishing reels adapted in operation to be held above the rod, particularly to the spin casting reels, and for which it is desired to provide a long life, with minimum maintenance requirements whilst maintaining a low cost price.

What is claimed is:

1. Fishing reel comprising spool means mountable on a rod for being normally held above the rod; a housing disposed on the spool means, having a pair of side walls which have at least generally parallel outer faces, with upper edges defining an opening of the housing; a line-release control push button and means for mounting the push-button on the housing for movement relative thereto; said push-button having an outer actuating surface and spaced apart side walls, said side walls including inner faces disposed at least substantially parallel to one another, closely engaging over and disposed outside said outer faces to substantially close said opening, during the entire movement of said push button, against any entrance of foreign bodies and of liquid into the housing.

2. Fishing reel according to claim 1, in which said actuating surface of the push button has at least a portion asymmetrically shaped to correspond to the shape of the fore part of a thumb applied thereon when the reel is held as for casting.

* * * * *